Aug. 28, 1956  M. D. HARPER  2,760,763
EGG BEATER
Filed Jan. 14, 1955
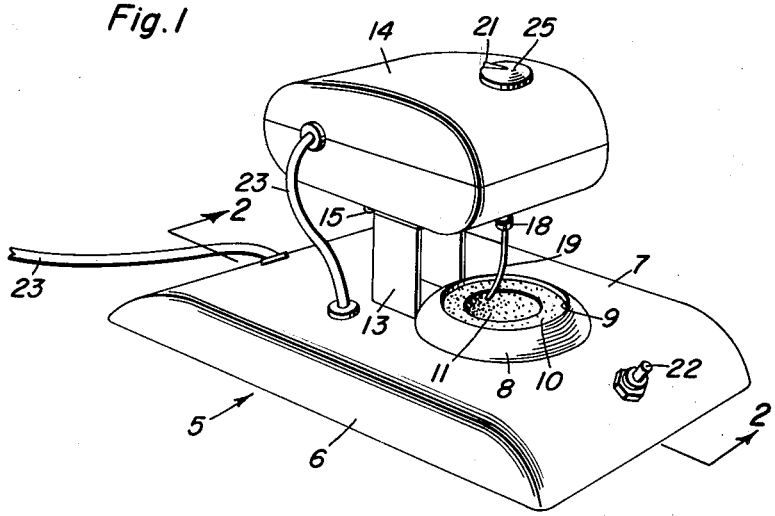
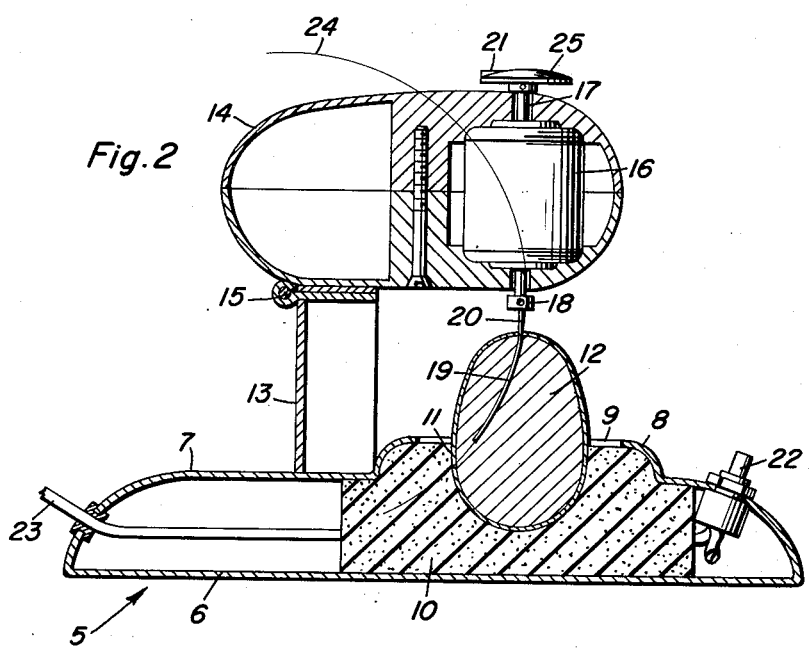
Murry D. Harper
INVENTOR.

United States Patent Office 2,760,763
Patented Aug. 28, 1956

2,760,763

EGG BEATER

Murry D. Harper, Dunbar, W. Va.

Application January 14, 1955, Serial No. 481,900

6 Claims. (Cl. 259—135)

The present invention relates to new and useful improvements in egg beaters, and has for its primary object to provide, in a manner as hereinafter set forth, a power driven device of this character which is adapted to thoroughly and rapidly mix or scramble eggs while still in the shell, after which said eggs may, if desired, be boiled in the usual manner or opened and cooked.

Another very important object of the invention is to provide a beater of the aforementioned character comprising a novel construction, combination and arrangement of parts whereby only a very small hole will be left in one end of the shell after the egg has been mixed or scrambled, which hole may be readily sealed or patched preparatory to boiling said egg.

Still another important object of the invention is to provide a beater of the character described which is adapted to mix or scramble eggs of different sizes.

Other objects of the invention are to provide a power driven in-the-shell egg beater which will be comparatively simple in construction, compact, highly efficient and reliable in use and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a perspective view of an egg beater constructed in accordance with the present invention; and Figure 2 is a view in vertical longitudinal section, taken substantially on the line 2—2 of Figure 1, showing an egg in position in the device.

Referring now to the drawing in detail, it will be seen that the embodiment of the invention which has been illustrated comprises a substantially rectangular base of suitable dimensions which is designated generally by reference character 5. The base 5 includes a shell 6 of suitable material, said shell comprising a top 7 which includes a raised forward portion 8 having a circular opening 9 therein. Mounted in the shell 6 beneath the opening 9 is a block or body 10 of sponge rubber or other suitable material. The resilient body 10 has formed in its upper portion a socket 11 which communicates with the opening 9 for the reception of the lower or base portion of an egg to be mixed or scrambled, as at 12.

Rising from the top 7 of the shell 6, rearwardly of the opening 9, is a post or standard 13. A somewhat longitudinally elongated housing 14, of suitable material, has its rear end portions hingedly mounted, as at 15, on the upper rear portion of the post 13. The housing 14, when in lowered or operative position, rests on the upper end of the post 13 and is supported thereby in a substantially horizontal position.

Mounted vertically in the free or forward end portion of the housing 14 is a suitable electric motor 16. The motor 16 includes a shaft 17 which projects above and below the housing 14. Removably and adjustably mounted in a chuck or the like 18 on the lower end of the motor shaft 17 and depending therefrom is an arcuate agitator 19 of suitable metal which terminates in a point at its free end. The agitator 19 includes a straight upper end portion 20. A manual turning disk or knob 25, comprising an indicator 21, is fixed on the upper end portion of the motor shaft 17. A suitable control switch 22 is provided on the front portion of the base 5 for the electric motor 16. The switch 22 is interposed in conductor wires 23 for connecting the motor 16 to a suitable source of electric current.

It is thought that the operation of the device will be readily apparent from a consideration of the foregoing. Briefly, the housing 14 is swung upwardly to an out-of-the-way position on the hinge 15 and the egg to be mixed or scrambled, as at 12, is positioned in the socket 11. After positioning the arcuate, needle-like agitator 19 through the medium of the knob 25, with the indicator 21 thereon, the housing 14 is swung downwardly for forcing said agitator into the egg through the upper end of the shell thereof. It is to be noted that the radius of the arcuate agitator 19 is its distance from the hinge or axis 15, as indicated at 24. Thus, a hole only large enough to admit the needle-like agitator 19 will be punched in the egg shell. This constitutes a highly important and desirable feature of the invention. The straight upper portion 20 of the agitator 19 permits eggs of any size to be scrambled without the hole in the shell being enlarged by said agitator. The switch 22 is now closed for energizing the electric motor 16, thus actuating the arcuate agitator 19 for rapidly and thoroughly scrambling the egg. The switch 22 is now opened to de-energize the electric motor 16. The indicator knob 25 is then turned, if necessary, to again position the arcuate agitator 19 concentric with the hinge 15. The housing 14 is then swung upwardly for withdrawing the agitator 19 from the egg, this being thus accomplished without enlarging the small hole in the shell.

It is believed that the many advantages of an egg beater constructed in accordance with the present invention will be readily understood and although a preferred embodiment of the device is as illustrated and described, it is to be understood that changes in the details of construction may be resorted to which will fall within the scope of the invention as claimed.

What is claimed as new is as follows:

1. An egg beater comprising: a support for an egg, a vertical motor mounted for vertical swinging movement on said support, an arcuate agitator mounted on the motor and adapted to penetrate the egg, the radius of said agitator being its distance from the swinging axis of the motor, and means for manually positioning the agitator.

2. An egg beater of the character described comprising: a base including a socket for the reception of an egg, a post rising from said base, a housing hingedly mounted for swinging movement in a vertical plane on the upper end of said post, an electric motor mounted vertically on the housing, and an arcuate agitator mounted on the motor for actuation thereby and adapted to penetrate the egg for scrambling same, the radius of said agitator being its distance from the hinged mounting of the housing.

3. An egg beater of the character described comprising: a base including a socket for the reception of an egg, a post rising from said base, a housing hingedly mounted for swinging movement in a vertical plane on the upper end of said post, an electric motor mounted vertically in said housing and including a vertical shaft, an arcuate agitator mounted on the lower end portion of said shaft for actuation by the motor and adapted to penetrate the egg, the radius of said agitator being its distance from the hinged mounting of the housing, and means on the upper end portion of the shaft for manually turning same for positioning the agitator for insertion in or withdrawal from the egg.

4. An egg beater of the character described comprising: a base including a shell comprising a top having an opening therein, a resilient body mounted in the shell and having a socket therein aligned with the opening for the reception of an egg, a post rising from the shell, a housing mounted for swinging movement in a vertical plane on the upper end of said post, an electric motor mounted vertically in said housing, and an arcuate agitator mounted on the motor for actuation thereby and adapted to penetrate the egg.

5. An egg beater of the character described comprising: a base including a shell comprising a top having an opening therein, a resilient body mounted in the shell and having a socket therein aligned with the opening for the reception of an egg, a post rising from the shell, a housing pivotally mounted for swinging movement in a vertical plane on the upper end of said post, an electric motor mounted vertically in said housing, and an arcuate agitator mounted on the motor for actuation thereby and adapted to penetrate the egg, the radius of said arcuate agitator being its distance from the pivotal mounting of the housing.

6. An egg beater of the character described comprising: a base including a shell comprising a top having an opening therein, a resilient body in the shell beneath the opening and having a socket therein communicating with said opening for the reception of an egg, a post rising from the base, an elongated housing having one end portion hingedly connected to the post, said housing being engageable with the upper end of the post to be supported thereby in a substantially horizontal position, an electric motor mounted vertically in the free end portion of the housing and including a shaft projecting above and below said housing, an arcuate agitator mounted on the lower end portion of the shaft for actuation by the motor and adapted to penetrate the egg, the radius of said arcuate agitator being its distance from the hinged connection of the housing, and means on the upper end portion of the motor shaft for manually turning same for setting the agitator and indicating the position thereof.

References Cited in the file of this patent
UNITED STATES PATENTS

| | | |
|---|---|---|
| 1,317,228 | Shelton | Sept. 30, 1919 |
| 2,131,290 | Kochner et al. | Sept. 27, 1938 |
| 2,316,861 | Hansen | Apr. 20, 1943 |